United States Patent [19]

Loftus et al.

[11] 4,411,533
[45] Oct. 25, 1983

[54] SYSTEM FOR MEASURING TEMPERATURE OF HOT GASES LADEN WITH ENTRAINED SOLIDS

[75] Inventors: Jordan Loftus; Paul N. Woldy, both of Houston, Tex.

[73] Assignee: Texaco Inc., White Plains, N.Y.

[21] Appl. No.: 258,090

[22] Filed: Apr. 27, 1981

[51] Int. Cl.³ .............................................. G01J 5/00
[52] U.S. Cl. ...................................... 374/125; 266/87; 266/100; 356/43; 350/582; 374/141; 374/139
[58] Field of Search ............... 73/355 R; 266/87, 100, 266/99; 356/44, 43; 350/319, 64, 582, 584; 374/125, 139, 141, 121; 425/143, 144; 222/156

[56] References Cited

U.S. PATENT DOCUMENTS

| | | | |
|---|---|---|---|
| 1,604,811 | 11/1926 | Curry et al. | 266/100 |
| 1,925,028 | 8/1933 | Brieger | 266/100 |
| 1,973,171 | 9/1934 | Jacobi | 266/100 |
| 2,395,937 | 3/1946 | Paalu | 73/355 R |
| 2,397,901 | 4/1946 | Zimmerman | 266/99 |
| 2,576,514 | 11/1951 | Bianco et al. | 73/355 R |
| 3,379,062 | 4/1968 | Lellep | 374/125 |

Primary Examiner—E. R. Kazenske
Assistant Examiner—Tom Noland
Attorney, Agent, or Firm—Carl G. Ries; Robert A. Kulason; Henry C. Dearborn

[57] ABSTRACT

An improvement for a system used to measure temperature of hot gases that are laden with entrained solids. The system involves use of a pyrometer that is mounted outside of a sight hole through the wall of a vessel containing the laden hot gases. And, the improvement concerns a projecting shelf above the sight hole to divert molten slag in order to keep the sight hole clear. Also there is a sloped recess at the bottom of the sight hole to drain any slag away from the lower portion thereof.

1 Claim, 4 Drawing Figures

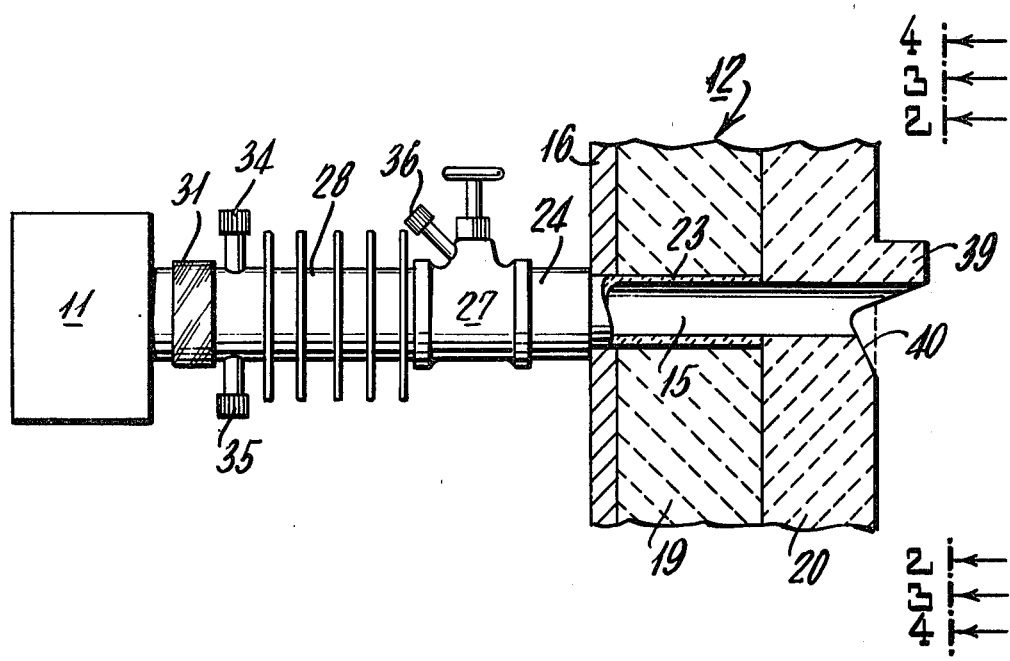
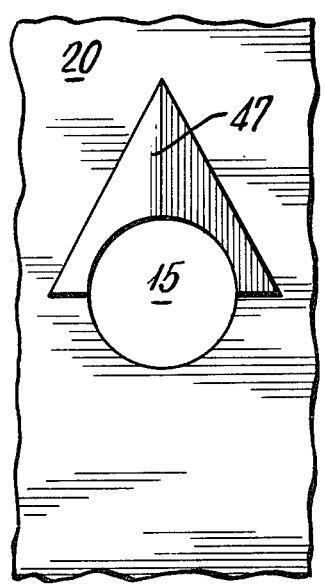
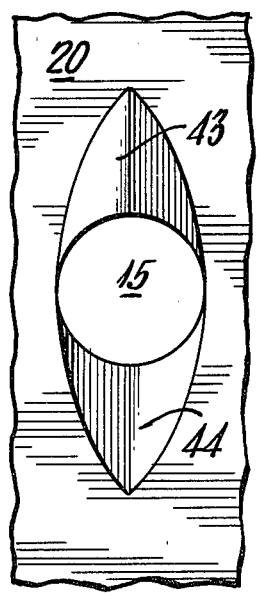
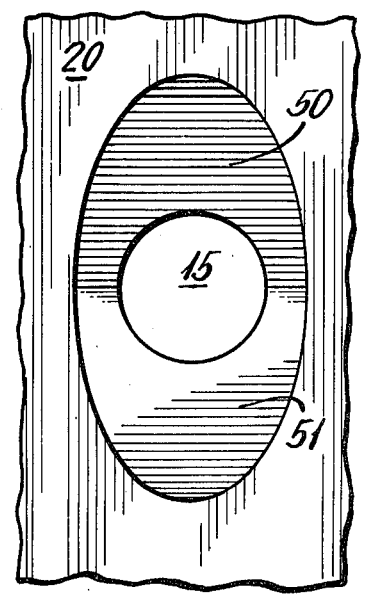

SYSTEM FOR MEASURING TEMPERATURE OF HOT GASES LADEN WITH ENTRAINED SOLIDS

BACKGROUND OF THE INVENTION

1. Field of the Invention

This invention concerns measurement of temperature of hot gases, in general. More specifically, it concerns an improvement for an arrangement with a pyrometer that is used to measure radiation from hot gases that are laden with entrained solids.

2. Description of the Prior Art

Pyrometers are used for measuring temperatures of hot atmospheres, such as the internal structure of a synthesis gas generator or the like, where the measurement involves reading the radiation from the hot atmosphere as it is measured by the pyrometer. Pyrometers deal with making radiation measurements which may then be translated into temperature. And, among various types of pyrometers there are those that measure total radiation and those that measure brightness and others that measure two-color or ratio measurements. Generally, the measurements involve determination of the energy radiated over the entire spectrum or over a narrow range of wavelength(s) being received and consequently the instruments for making these measurements are quite delicate and must be protected from high temperature conditions.

Heretofore, arrangements have been made such as the apparatus shown and described in U.S. Pat. No. 2,576,514, H. R. Bianco et al, issued Nov. 27, 1951. In the Bianco et al patent, an arrangement is provided to overcome the difficulty that developed where the atmosphere being measured by the pyrometer was a molten bath or slag or like high melting temperature substance. The patent applies a radiation pyrometer to overcome drawbacks encountered with the use of a thermocouple or an optical pyrometer.

The arrangement of the Bianco et al patent includes a sight tube with the mounting for a radiation pyrometer. The sight tube extends through the furnace wall and has an arrangement for cooling it. And, in that patent, the problem of having the hot molten liquid tend to block the inside end of the sight tube was overcome by providing a longitudinally movable sight tube so that the movement thereof would dislodge and break up any blockage tending to form over the end by the molten liquid.

In the applicants' invention there is provided an improvement for a combination that uses a pyrometer. It overcomes and avoids all the complications and additional equipment used in a system like that of the Bianco et al patent. Thus, it is an object of this invention to provide a relatively simple yet highly effective improvement for a system that employs a pyrometer with sight tube and related equipment. The system is used to make temperature measurements on the interior of a vessel containing hot gases laden with entrained solids that form molten slag.

SUMMARY OF THE INVENTION

Briefly, the invention concerns a system for measuring the temperature of hot gases laden with entrained solids forming molten slag and contained in a vessel having an upstanding refractory wall with a sight hole through said wall. The system comprises a pyrometer with an optical window for admitting radiant energy to be measured, and means for attaching said pyrometer to said vessel including sight tube means for aligning said optical window with said sight hole. It also comprises means on the inside of said vessel wall for diverting said molten slag around said sight hole.

Again briefly, the invention concerns the improvement that is in combination with a vessel containing high temperature gases laden with molten slag, and a pyrometer for measuring temperature of said gases by radiation. The combination with improvement also includes a sight hole through an upstanding wall of said vessel, and means for mounting said pyrometer to receive said radiation through said sight hole. The improvement with the foregoing combination comprises projecting means on said vessel wall for diverting said molten slag from said sight hole.

Once more briefly, the invention is in combination with a vessel having vertical walls and containing high temperature gases laden with molten slag, as well as a pyrometer for measuring temperature of said gases by radiation. The combination also includes a sight hole through one of said vertical walls, and a valve, plus an offset spool for mounting said pyrometer to receive said radiation through said sight hole, valve and spool. In combination with the foregoing elements the improvement comprises a projecting shelf integral with said wall and the top of said sight hole for diverting said molten slag to keep it open, and a sloped recess integral with the bottom of said sight hole for draining said slag away from the bottom edge to keep it open.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic side elevation plus a partial cross section, illustrating a combination of the elements included in the invention;

FIG. 2 is a fragmentary enlarged elevational view of the inside end of the sight hole, taken along the lines 2—2 in FIG. 1 and looking in the direction of the arrows;

FIG. 3 is another view like FIG. 2 taken along the lines 3—3 and showing a modification of the structure according to the invention; and FIG. 4 is another view like FIGS. 2 and 3 taken along the lines 4—4 and illustrating still another modification of the structure according to the invention.

DESCRIPTION OF THE PREFERRED EMBODIMENTS

As indicated above, the measurement of high temperatures in adverse atmospheres may be carried out using radiation pyrometry, and the pyrometer instrument in such case must be protected from the atmosphere of the high temperature hot gases and/or solids. Therefore, an arrangement of elements like those illustrated in FIG. 1 is needed. Thus, referring to FIG. 1 there is a pyrometer 11 that is attached to receive radiation from the interior of a vessel 12 through a sight hole 15 that extends through a vertical wall 16 of the vessel 12. The wall 16 includes interior refractory lining layers 19 and 20. Sight hole 15 goes through the refractory layers 19 and 20 as well as the wall 16. Also, there is a refractory sleeve 23 which extends out beyond the wall 16 on the inside of a short nozzle 24.

The nozzle 24 connects with one port of a valve 27. And, there is a spool 28 that is connected to the other port of the valve 27. It will be understood that the internal structure of the valve is such that when open there is no obstruction to a clear path which is the same size as the hole 15. This is necessary because the hole 15 is a sight passageway for the radiation being measured by the pyrometer 11.

At the other end of the spool 28 from the valve 27, there is an optical window 31 that is made of the proper quartz or other material in order to permit passage of the radiation that is being measured, while closing the end of the spool 28 against gas flow.

In order to keep from having any of the high temperature gases from within the vessel 12 adversely effect the interior of the sight hole 15 and particularly near the window 31, there are purge gas connectors 34, 35, and 36. At these locations, any satisfactory purge gas such as nitrogen is introduced across the face of the window 31. Also, a smaller quantity may be introduced to the interior of the valve 27 via the connector 36. Such purge gas is introduced at relatively low differential pressure over the internal pressure of the vessel 12, so that purge gas continuously flows out into the interior of the vessel 12.

In an atmosphere such as the interior of a coal gasification generator (e.g. the vessel 12), there is a mixture of extremely high temperature gases that are laden with molten slag. And, it is such an atmosphere that is to have the temperature thereof measured by the combination of elements according to this invention. It has been found that the conditions mentioned above, i.e. an atmosphere of molten slag laden gases, tends to cause a hot molten liquid flow down the inside walls of the generator. And, such conditions tend to cause a blockage of the open end of the sight hole 15. In order to overcome such conditions, the inner layer 20 of the wall of the vessel 12 is constructed with an integral projecting shelf 39 over the top portion of the hole 15. Then in addition there may be a sloped recess 40 that is formed integrally with the bottom portion of the hole 15, i.e. hollowed out from the inner face of the layer 20.

FIGS. 2, 3 and 4 illustrate different modifications of the geometric shape of the protective elements that were shown and described above in connection with the projecting shelf 39 and the recess 40. FIG. 2 shows a projection 43 in the form of a roof that extends out from the face of the layer 20. It is integrally formed with the material of the layer 20 in such manner as to form a projecting roof over the upper half of the hole 15. It may have a sharp edge where it meets the face of the layer 20, or it may be smoothly shaped or provided with a fillet (not shown). Below the hole 15, the surface of layer 20 is formed with a recess 44 that slopes out and joins the face of the layer 20 below the hole 15.

In the modification illustrated in FIG. 3 the projection above the hole 15 takes the form of a triangular roof element 47. It is integrally formed with the material of the layer 20, and as with the projection 43 of FIG. 2 it may have a fillet (not shown) where it joins the surface of the layer 20. In this modification there is no recess on the bottom half of the hole 15 because it is expected that the structure of the roof 47 will sufficiently protect the opening and keep the molten slag from accumulating on the bottom half of the hole 15.

FIG. 4 illustrates another modification of the structure for the protective elements at the end of the hole 15. Thus, in this case there is an upper half oblong projection 50 that extends down about half way over the hole 15. It is joined to a recess 51 that extends from the lower half of the hole 15 for helping drain off any molten slag that may reach this area.

While particular embodiments of the invention have been described above in considerable detail in accordance with the applicable statutes, this is not to be taken as in any way limiting the invention but merely as being descriptive thereof.

We claim:

1. In combination with a stationary vessel having vertical walls and containing high temperature gases laden with molten slag,
    said slag flowing down the inside of said vertical walls,
    a pyrometer for measuring temperature of said gases by radiation,
    a horizontal sight hole through one of said vertical walls and above said slag,
    a valve, and
    an offset spool for mounting said pyrometer to receive said radiation through said sight hole, said valve and said spool,
    the improvement comprising a projecting horizontal shelf integral with said inside of said wall and projecting around the top half of said sight hole for diverting said molten slag around said sight hole to keep said sight hole open, and
    a sloped recess in said wall on said inside thereof and extending from the bottom half of said sight hole for draining said slag away from the bottom edge of said sight hole to keep said sight hole open.

* * * * *